US012717197B2

(12) United States Patent
Yoshida

(10) Patent No.: US 12,717,197 B2
(45) Date of Patent: Aug. 25, 2026

(54) LIGHT CONTROL DEVICE AND LIGHT CONTROL SHEET

(71) Applicant: TOPPAN HOLDINGS INC., Tokyo (JP)

(72) Inventor: Tetsushi Yoshida, Taito-ku (JP)

(73) Assignee: TOPPAN HOLDINGS INC., Tokyo (JP)

( * ) Notice: Subject to any disclaimer, the term of this patent is extended or adjusted under 35 U.S.C. 154(b) by 0 days.

(21) Appl. No.: 18/768,072

(22) Filed: Jul. 10, 2024

(65) Prior Publication Data

US 2024/0361660 A1 Oct. 31, 2024

Related U.S. Application Data

(63) Continuation of application No. PCT/JP2023/000828, filed on Jan. 13, 2023.

(30) Foreign Application Priority Data

Jan. 13, 2022 (JP) ................................ 2022-003783

(51) Int. Cl.

*G02F 1/137* (2006.01)
*G02F 1/1337* (2006.01)
*G02F 1/1343* (2006.01)

(52) U.S. Cl.

CPC .... *G02F 1/13756* (2021.01); *G02F 1/133738* (2021.01); *G02F 1/13439* (2013.01); *G02F 1/13706* (2021.01)

(58) Field of Classification Search

CPC ........... G02F 1/13756; G02F 1/133738; G02F 1/13439; G02F 1/13706; G02F 2203/11;

(Continued)

(56) References Cited

U.S. PATENT DOCUMENTS 5,437,811 A 8/1995 Doane et al.
6,061,107 A 5/2000 Yang et al.
2008/0316395 A1 12/2008 O'Keeffe

FOREIGN PATENT DOCUMENTS

CN 102053417 A 5/2011
JP H06-222342 A 8/1994

(Continued)

OTHER PUBLICATIONS

CN 102053417 A machine translation (Year: 2011).*

(Continued)

*Primary Examiner* — James A Dudek
(74) *Attorney, Agent, or Firm* — Oblon, McClelland, Maier & Neustadt, L.L.P.

(57) ABSTRACT

A light control sheet includes a first transparent electrode layer, a second transparent electrode layer, and a light control layer including a liquid crystal composition having positive dielectric anisotropy and including chiral nematic liquid crystals. A control unit of a light control device controls voltage applied between the transparent electrode layers to a first voltage to bring the light control sheet into a first state of reflecting infrared light and transmitting visible light, controls the voltage applied between the transparent electrode layers to a second voltage to bring the light control sheet into a second state of scattering infrared light and visible light, and controls the voltage applied between the transparent electrode layers to a third voltage to bring the light control sheet into a third state of transmitting infrared light and visible light.

19 Claims, 7 Drawing Sheets

(58) Field of Classification Search
CPC ............... G02F 1/13718; G02F 1/1334; E06B 2009/2464; E06B 9/24; Y02B 80/00
See application file for complete search history.

(56) References Cited

FOREIGN PATENT DOCUMENTS

| | | | |
|---|---|---|---|
| JP | 2010-531468 | A | 9/2010 |
| JP | 2018-205440 | A | 12/2018 |

OTHER PUBLICATIONS

Extended European Search Report issued Mar. 24, 2025 in European Patent Application No. 23740338.1, 9 pages.
International Search Report issued Mar. 20, 2023 in PCT/ JP2023/000828, filed Jan. 13, 2023, with English translation, 6 pages.

* cited by examiner

LIGHT CONTROL DEVICE AND LIGHT CONTROL SHEET

CROSS-REFERENCE TO RELATED APPLICATIONS

The present application is a continuation of and claims the benefit of priority to International Application No. PCT/JP2023/000828, filed Jan. 13, 2023, which is based upon and claims the benefit of priority to Japanese Application No. 2022-003783, filed Jan. 13, 2022. The entire contents of these applications are incorporated herein by reference.

BACKGROUND OF THE INVENTION

Field of the Invention

The present invention relates to light control devices and light control sheets.

Description of Background Art

JP 2018-205440 A describes an infrared-cut sheet including a metal layer and a metal oxide layer to reflect infrared light. The entire contents of this publication are incorporated herein by reference.

SUMMARY OF THE INVENTION

According to one aspect of the present invention, a light control device includes a light control sheet including a first transparent electrode layer, a second transparent electrode layer, and a light control layer formed between the first transparent electrode layer and the second transparent electrode layer, and a control unit including circuitry that applies a first voltage between the first transparent electrode layer and the second transparent electrode layer to bring the light control sheet into a first state in which infrared light is reflected and visible light is transmitted, applies a second voltage greater than the first voltage between the first transparent electrode layer and the second transparent electrode layer to bring the light control sheet into a second state in which infrared light and visible light are scattered, and applies a third voltage greater than the second voltage between the first transparent electrode layer and the second transparent electrode layer to bring the light control sheet into a third state in which infrared light and visible light are transmitted. The light control layer in the light control sheet includes a transparent polymer layer including voids and a liquid crystal composition retained in the voids and comprising chiral nematic liquid crystals having positive dielectric anisotropy.

According to one aspect of the present invention, a light control sheet includes a first transparent electrode layer, a second transparent electrode layer, and a light control layer formed between the first transparent electrode layer and the second transparent electrode layer and including a transparent polymer layer including voids and a liquid crystal composition retained in the voids such that the liquid crystal composition includes chiral nematic liquid crystals having positive dielectric anisotropy. The liquid crystal composition exhibits a planar state when a first voltage is applied between the first transparent electrode layer and the second transparent electrode layer such that the light control sheet reflects infrared light and transmits visible light, a focal conic state when a second voltage greater than the first voltage is applied between the first transparent electrode layer and the second transparent electrode layer such that the light control sheet scatters infrared light and visible light, and a homeotropic state when a third voltage greater than the second voltage is applied between the first transparent electrode layer and the second transparent electrode layer such that the light control sheet transmits infrared light and visible light, and the liquid crystal composition satisfy $0.8 \leq P \times (ne+2no)/3 \leq 2.2$ where P is a helical pitch in μm, no is an ordinary light refractive index, and ne is an extraordinary light refractive index.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
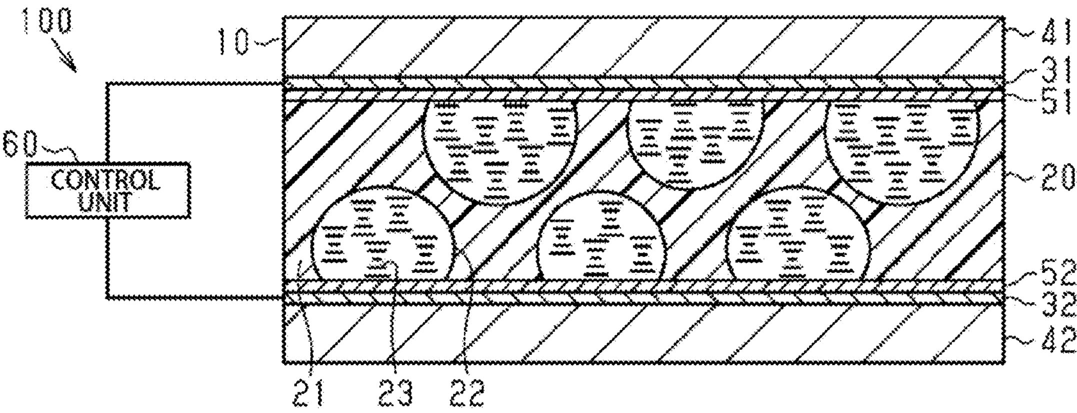
FIG. 1 is a diagram illustrating a light control device including a light control sheet in a first state according to a first embodiment of the present invention.

Embodiments will now be described with reference to the accompanying drawings, wherein like reference numerals designate corresponding or identical elements throughout the various drawings.

First Embodiment

Referring to FIGS. 1 to 6, a first embodiment of a light control device and a light control sheet will be described. In the following description, infrared light refers to the light in the wavelength region of 800 nm or more, and visible light refers to the light in the wavelength region of 360 nm or more and less than 800 nm. The upper limit of the wavelength of infrared light is 1 mm.

Configuration of Light Control Sheet and Light Control Device

As shown in FIG. 1, a light control sheet 10 includes a light control layer 20, two transparent electrode layers 31 and 32, two transparent support layers 41 and 42, and two alignment layers 51 and 52. The two transparent electrode layers 31 and 32 are a first transparent electrode layer 31 and a second transparent electrode layer 32, the two transparent support layers 41 and 42 are a first transparent support layer 41 and a second transparent support layer 42, and the two alignment layers are a first alignment layer 51 and a second alignment layer 52.

The light control layer 20 is sandwiched between the first and second transparent electrode layers 31 and 32. The first alignment layer 51 is provided between the light control layer 20 and the first transparent electrode layer 31, in the state of being in contact with them. The second alignment layer 52 is provided between the light control layer 20 and the second transparent electrode layer 32, in the state of being in contact with them. The first transparent support layer 41 is provided on one side of the first transparent electrode layer 31 to support it on the opposite side to that facing the light control layer 20, and the second transparent support layer 42 is provided on one side of the second transparent electrode layer 32 to support it on the opposite side to that facing the light control layer 20.

The light control layer 20 contains a transparent polymer layer 21 and a liquid crystal composition, i.e., chiral nematic liquid crystals. The liquid crystal composition contains liquid crystal molecules 23. The transparent polymer layer 21 defines multiple voids 22 therein, with the liquid crystal composition retained therein. The liquid crystal composition has positive dielectric anisotropy. Specifically, the dielectric constant of the liquid crystal molecules 23 in the long-axis direction is greater than the dielectric constant thereof in the short-axis direction.

Examples of the liquid crystal molecules 23 include liquid crystal molecules of Schiff bases, azo types, azoxy types, biphenyls, terphenyls, benzoic acid esters, tolan types, pyrimidines, cyclohexanecarboxylic acid esters, phenylcyclohexanes, and dioxanes. Examples of the chiral agent contained in the liquid crystal composition include optically active low molecular weight compounds having one or more asymmetric carbon atoms.

The structure of the transparent polymer layer 21 and the retention type for the liquid crystal composition may, for example, be a polymer network type, a polymer dispersion type, or a capsule type. A polymer network type light control layer 20 may include a polymer network having a three-dimensional mesh. The polymer network is an example of a transparent polymer layer, and retains a liquid crystal composition in the interconnected voids in the mesh of the polymer network. A polymer dispersion type light control layer 20 may include a transparent polymer layer in which numerous isolated voids are defined, and retain a liquid crystal composition in the voids dispersed in the transparent polymer layer. A capsule type light control layer 20 may retain a liquid crystal composition in capsule-shaped voids dispersed in a transparent polymer layer.

The first and second transparent electrode layers 31 and 32 are made of an electrically conductive material and are transparent to visible light. Known materials may be used for forming the transparent electrode layers 31 and 32. Examples of the materials for forming the first and second transparent electrode layers 31 and 32 include indium tin oxide, fluorine-doped tin oxide, tin oxide, zinc oxide, carbon nanotubes, and poly(3,4-ethylenedioxythiophene).

The first and second transparent support layers 41 and 42 are substrates transparent to visible light. Known materials may be used for forming the transparent support layers 41 and 42. The materials for forming the transparent support layers 41 and 42 may include synthetic resins and inorganic compounds. Examples of the synthetic resins include polyesters, polyacrylates, polycarbonates, and polyolefins. Examples of the polyesters include polyethylene terephthalate and polyethylene naphthalate. Examples of the polyacrylates include polymethylmethacrylate. Examples of the inorganic compounds include silicon dioxide, silicon oxynitride, and silicon nitride.

The first and second alignment layers 51 and 52 are horizontal alignment films. These horizontal alignment films align the liquid crystal molecules 23 such that the long-axis direction thereof will be parallel to the surfaces of the alignment films. The materials for forming the alignment layers 51 and 52 may include organic compounds, inorganic compounds, and mixtures of these. Examples of the organic compounds include polyimides, polyamides, polyvinyl alcohols, and cyanide compounds. Examples of the inorganic compounds include silicon oxides and zirconium oxides. The materials for forming the alignment layers 51 and 52 may be silicones. Silicones are compounds having inorganic and organic parts.

A light control device 100 includes one light control sheet 10 and a control unit 60 for controlling voltage application to the transparent electrode layers 31 and 32. The control unit 60 is connected to the first and second transparent electrode layers 31 and 32 via respective wirings. The control unit 60 generates a voltage for driving the light control sheet 10 and applies the generated voltage to the transparent electrode layers 31 and 32 via the wirings. The control unit 60 controls the magnitude of the voltage applied between the transparent electrode layers 31 and 32 by controlling application or non-application of the voltage and by controlling the magnitude of the applied voltage.

The control unit 60 controls the voltage applied between the transparent electrode layers 31 and 32 to any of a first voltage V1, a second voltage V2, and a third voltage V3. The first voltage V1 is 0 V, the second voltage V2 is greater than the first voltage V1, and the third voltage V3 is greater than the second voltage V2.

FIG. 1 schematically illustrates the light control sheet 10 in a first state. In the first state, the voltage applied between the transparent electrode layers 31 and 32 is controlled to the first voltage V1, and the liquid crystal composition exhibits a planar state. Specifically, many of the liquid crystal molecules 23 contained in the light control layer 20 are formed with the long-axis direction thereof being substantially parallel to the alignment layers 51 and 52 and the transparent electrode layers 31 and 32, and with the helical axis of the liquid crystal composition having a helical structure extending substantially orthogonally to the alignment layers 51 and 52 and the transparent electrode layers 31 and 32.

When the liquid crystal composition, i.e., chiral nematic liquid crystals, is in a planar state, the liquid crystal composition selectively reflects light in part of the wavelength region. In the present embodiment, the liquid crystal composition selectively reflects infrared light when a helical pitch P (μm), ordinary light refractive index no, and extraordinary light refractive index ne of the liquid crystal composition satisfy the following Formula (1-1).

$$0.8 \leq P \times (ne + 2no)/3 \leq 2.2 \quad (1\text{-}1)$$

Thus, in the first state, the light control layer 20 selectively reflects infrared light contained in light entering from the front or rear surface of the light control sheet 10 toward the light control layer 20. The helical pitch P, ordinary light refractive index no, and extraordinary light refractive index ne of the liquid crystal composition can be adjusted by selecting the type of the liquid crystal molecules 23, type of the chiral agent, amount of the chiral agent, etc.

In the above Formula (1-1), P×(ne+2no)/3 is a formula specifying the wavelength reflected by the liquid crystal composition. The logic for deriving this formula will be described below.

The wavelength reflected by the liquid crystal composition, i.e., chiral nematic liquid crystals, is expressed by the product of the helical pitch P and the refractive index n of the liquid crystal composition. As the refractive index n, it is most convenient to use the ordinary light refractive index no. However, an average value of the ordinary light refractive index no and the extraordinary light refractive index ne may be used as the refractive index n, considering that the liquid crystal molecules have birefringence, the helical axis of the liquid crystal composition in the light control sheet 10 in the first state can be assumed to be orthogonal to the light control sheet 10, and, when light is externally incident on the light control sheet 10, the direction of the light propagation becomes substantially equal to the orientation of the helical axis.

A calculated value of the reflected wavelength is compared with an actual measured value of the reflected wavelength of the light control sheet 10, for the case where the ordinary light refractive index no is used as the refractive index n, and for the case where an average value of the ordinary light refractive index no and the extraordinary light refractive index ne is used as the refractive index n. Consequently, it was confirmed that there was a discrepancy between the peak median value in the actual measurements, i.e., the median value of a peak width in a peak having the width, and the calculated value of the reflected wavelength.

Herein, the possibility of the helical axis being inclined is focused. In this case, the effective refractive index of the liquid crystal composition to the incident light is closer to the ordinary light refractive index no than to the average value of the ordinary light refractive index no and the extraordinary light refractive index ne. In this regard, the ordinary light refractive index no is weighted, the weighted ordinary light refractive index no and the extraordinary light refractive index ne are weight-averaged, and the resultant value is used as the refractive index n to thereby derive the above formula P×(ne+2no)/3. Thus, the calculated value of the reflected wavelength using this formula matched the peak median value in the actual measurements of the reflected wavelength of the light control sheet 10 is confirmed. This implies that the apparent helical pitch P changes depending on the inclination of the helical axis and that the variation in the helical pitch P and the above change in the helical pitch P are the factors causing the peak in the actual measurements of the reflected wavelength to have some width.

As described above, not only the birefringence of the liquid crystal molecules, but also the inclination of the helical axis are focused, and the formula in which the ordinary light refractive index no was weighted is resultantly used, to thereby find that the wavelength reflected by the liquid crystal composition in a planar state could be more accurately calculated.

Using the liquid crystal composition satisfying the above Formula (1-1) for the light control layer 20, infrared light can be reliably reflected at the light control sheet 10 in the first state. More specifically, a circularly polarized light component rotating in the same direction as the direction in which the helical axis of the liquid crystal composition is twisted is reflected from the infrared light incident on the light control layer 20, and other components are transmitted through the light control layer 20. Also, in the first state, the light in the wavelength regions other than the infrared wavelength region is transmitted through the light control layer 20, and therefore visible light is transmitted through the light control sheet 10 in the first state.

In order to more reliably reflect the light in the infrared wavelength region contained in sunlight, the helical pitch P (μm), ordinary light refractive index no, and extraordinary light refractive index ne of the liquid crystal composition are preferred to satisfy the following Formula (1-2).

$$0.9 \leq P \times (ne + 2no)/3 \leq 1.1 \quad (1\text{-}2)$$

In order to increase the reflectance of infrared light, in the first state, the liquid crystal molecules 23 are preferred to be horizontally aligned, i.e., the liquid crystal molecules 23 are preferred to be aligned substantially parallel to the alignment layers 51 and 52 and the transparent electrode layers 31 and 32, in 50% or more of the area of light control layer 20. It is preferred that the proportion of the transparent polymer layer 21 in the light control layer 20 is less than 50%. For example, in the image observed using a polarizing microscope, if the horizontal alignment area near the surfaces of the light control layer 20 is 50% or more, the proportion of the horizontal alignment area in the entire light control layer 20 can be determined to be 50% or more.

On the other hand, in order to reliably form the retention structure for the liquid crystal composition by the transparent polymer layer 21, the proportion of the transparent polymer layer 21 in the light control layer 20 is preferred to be 10% or more, and more preferred to be 20% or more. The proportion of the liquid crystal composition in the light control layer 20 is preferred to be 50% or more and 90% or less, and more preferred to be 60% or more and 80% or less. Accordingly, in order to increase the reflectance of infrared light, while suitably forming the retention structure for the liquid crystal composition, the area where the liquid crystal molecules 23 are horizontally aligned, in the first state, is preferred to be 50% or more and 90% or less, and more preferred to be 60% or more and 80% or less, of the light control layer 20.

Figure 2:
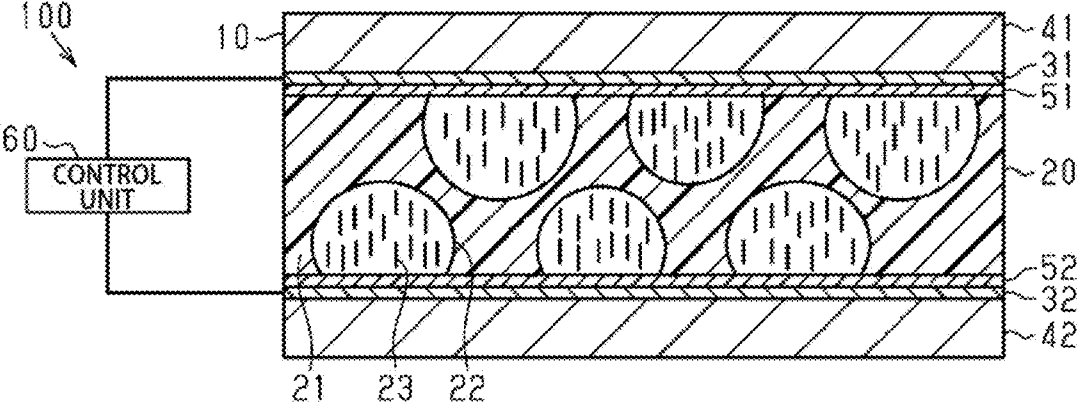
FIG. 2 is a diagram illustrating the light control device including the light control sheet in a third state according to the first embodiment of the present invention.

FIG. 2 schematically illustrates the light control sheet 10 in a third state. In the third state, the voltage applied between the transparent electrode layers 31 and 32 is controlled to the third voltage V3, and the liquid crystal composition exhibits a homeotropic state. Specifically, the helical structure of the liquid crystal composition is unraveled, and the liquid crystal molecules 23 are aligned in the direction of the electric field between the transparent electrode layers 31 and 32. In other words, the liquid crystal molecules 23 are formed such that the long-axis direction thereof will be parallel to the direction orthogonal to the alignment layers 51 and 52, and the transparent electrode layers 31 and 32.

Thus, the third voltage V3 has a magnitude of allowing the liquid crystal composition to align in a homeotropic state. The liquid crystal composition exhibits a homeotropic state with an application of a predetermined voltage or more suitable for the composition. The third voltage V3 corresponds to the predetermined voltage or more.

When the liquid crystal composition is in the homeotropic state, infrared light passes through the light control layer 20. In order to prevent the traveling direction of infrared light from deviating in the light control layer 20, a refractive index np of the polymer material constituting the transparent polymer layer 21 is preferred to substantially match the ordinary light refractive index no of the liquid crystal composition. Specifically, it is preferred that the refractive index np of the polymer material for the infrared wavelength and the ordinary light refractive index no of the liquid crystal composition satisfy the following Formula (2-1). The infrared wavelength may, for example, be the wavelength reflected by the liquid crystal composition calculated from the above formula $P\times(ne+2no)/3$ for specifying a reflected wavelength.

$$0.98 \leq np/no \leq 1.02 \tag{2-1}$$

In order to increase the infrared light transmittance, the transparent support layers 41 and 42 are preferred to have an infrared light reflectance of less than 15%, and more preferably less than 10%.

In the third state, visible light is also transmitted through the light control layer 20. Specifically, in the third state, both of infrared light and visible light are transmitted through the light control sheet 10.

Figure 3:
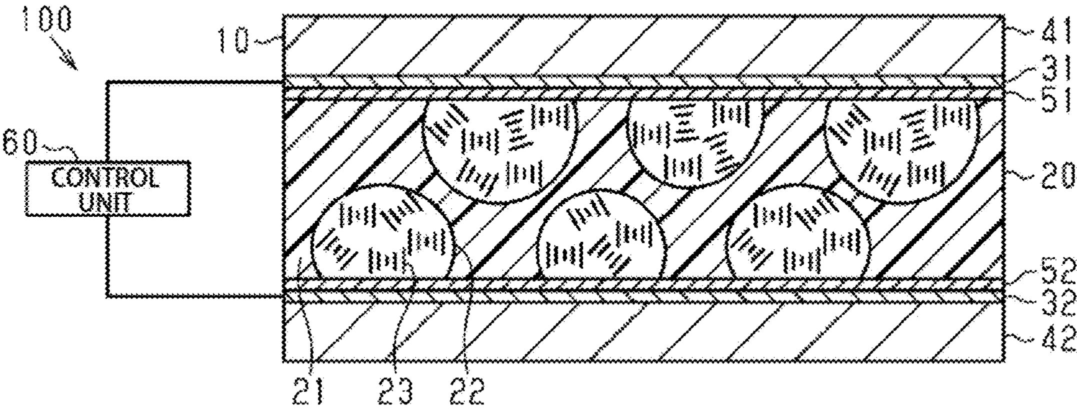
FIG. 3 is a diagram illustrating the light control device including the light control sheet in a second state according to the first embodiment of the present invention.

FIG. 3 schematically illustrates the light control sheet 10 in a second state. In the second state, the voltage applied between the transparent electrode layers 31 and 32 is controlled to the second voltage V2, and the liquid crystal composition exhibits a focal conic state. Specifically, the liquid crystal composition has a helical structure, and the helical axis of the liquid crystal composition extends in a direction, such as in the direction parallel to the alignment layers 51 and 52 and the transparent electrode layers 31 and 32, different from the direction orthogonal to these layers.

As described above, the liquid crystal composition exhibits a homeotropic state with an application of a predetermined voltage or greater suitable for the composition. The second voltage V2 is greater than 0 V and less than the predetermined voltage.

When the liquid crystal composition is in the focal conic state, the angles each made between the light incidence direction on the light control sheet 10 and the long-axis direction of the liquid crystal molecules 23 are not constant but are varied within the light control layer 20, and therefore infrared light is reflected in various directions. In other words, infrared light is scattered. In the focal conic state, the refractive index may fluctuate due to variation in helical-axis direction, and therefore visible light incident on the light control layer 20 may also be scattered.

Figure 4:
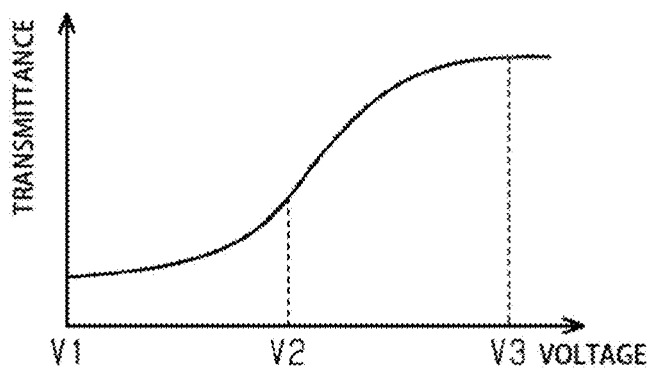
FIG. 4 is a graph showing a typical example of a relationship between applied voltage and infrared light transmittance for the light control sheet according to the first embodiment of the present invention.

FIG. 4 is a graph showing a typical example of the relationship between voltage applied between the transparent electrode layers 31 and 32 and infrared light transmittance in the light control sheet 10 when the light control sheet 10 changes from the first state to the third state via the second state. As shown in FIG. 4, as the voltage increases from the first voltage V1 to the third voltage V3, the infrared light transmittance increases monotonically. In this graph, change in transmittance is gradual in the vicinities of the first and third voltages V1 and V3. However, in the vicinity of the second voltage V2, the transmittance changes abruptly.

As described above, in the first state in which the first voltage V1 is applied between the transparent electrode layers 31 and 32, the infrared light reflection becomes large in the light control layer 20, and therefore the infrared light transmittance becomes small. However, in the third state in which the third voltage V3 is applied between the transparent electrode layers 31 and 32, the infrared light transmittance becomes large. In the second state in which the second voltage V2 is applied between the transparent electrode layers 31 and 32, scattering of infrared light occurs, and therefore the infrared light transmittance becomes higher than in the first state and becomes lower than in the third state. Thus, the infrared light transmittance in the light control sheet 10 changes, as shown in FIG. 4, according to the change in voltage applied between the transparent electrode layers 31 and 32.

The change from the first state to the second state and the change from the second state to the third state are possible only in one direction. Specifically, if the voltage applied between the transparent electrode layers 31 and 32 is changed from the first voltage V1 to the second voltage V2 when the light control sheet 10 is in the first state, the light control sheet 10 changes from the first state to the second state. However, even if the voltage applied between the transparent electrode layers 31 and 32 is changed from the second voltage V2 to the first voltage V1 when the light control sheet 10 is in the second state, the change from the second state to the first state does not occur, but the liquid crystal composition remains in the focal conic state.

Similarly, if the voltage applied between the transparent electrode layers 31 and 32 is changed to the third voltage V3 when the light control sheet is in the second state, the light control sheet 10 changes from the second state to the third state. However, even if the voltage applied between the transparent electrode layers 31 and 32 is changed from the third voltage V3 to the second voltage V2 when the light control sheet 10 is in the third state, the change from the third state to the second state does not occur, but the liquid crystal composition remains in the homeotropic state.

In contrast, the change between the first state and the third state is possible in both directions. Specifically, if the voltage applied between the transparent electrode layers 31 and 32 is changed from the first voltage V1 to the third voltage V3 when the light control sheet 10 is in the first state, the light control sheet 10 changes from the first state to the third state. If the voltage applied between the transparent electrode layers 31 and 32 is changed from the third voltage V3 to the first voltage V1 when the light control sheet 10 is in the third state, the light control sheet 10 changes from the third state to the first state.

Operation of Light Control Sheet and Light Control Device

Figure 5:
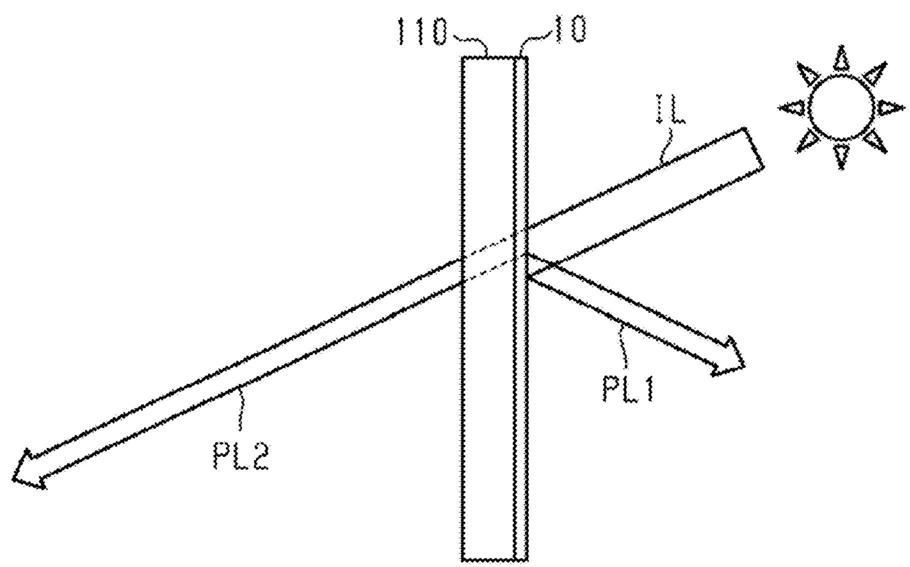
FIG. 5 is a diagram illustrating a usage mode of the light control sheet in the first state according to the first embodiment of the present invention.
Figure 6:
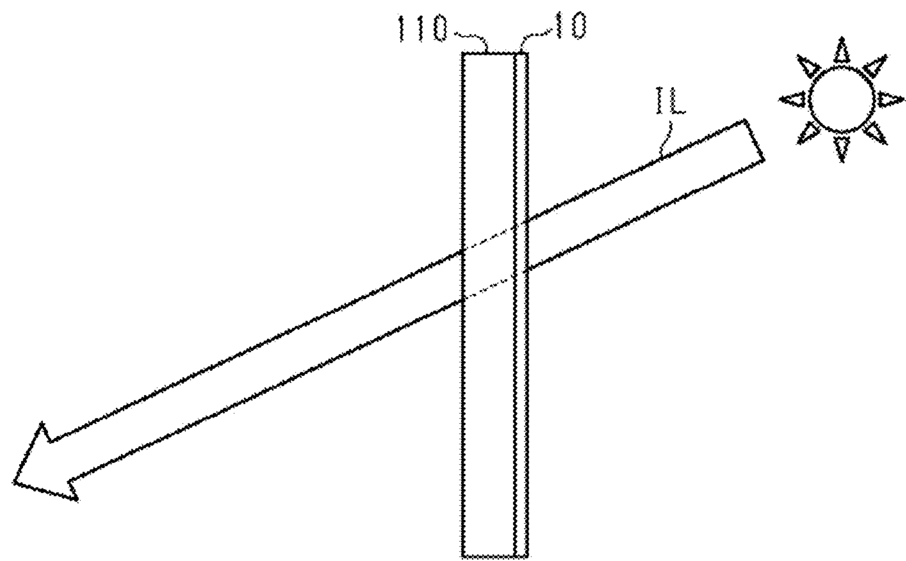
FIG. 6 is a diagram illustrating a usage mode of the light control sheet in the third state according to the first embodiment of the present invention.

FIGS. 5 and 6 schematically show the usage state of the light control sheet 10. The front surface or the rear surface of the light control sheet 10 is affixed to a transparent plate 110 made of glass, resin, etc. via an adhesive layer. The transparent plate 110 is provided at the boundary between outdoors and indoors of a building or a mobile object such as a vehicle. Specifically, the transparent plate 110 defines an internal space of a building or a mobile object from the exterior. The transparent plate 110 corresponds, for example, to the window glass or glass walls of various buildings such as houses, or the window glass of mobile objects such as vehicles and aircraft. The surface of the transparent plate 110 may be flat or curved. The light control sheet 10 may be affixed to either of the indoor side or the outdoor side of the transparent plate 110.

FIG. 5 shows the light control sheet 10 in the first state. In other words, the driving of the light control device 100 is in an off state. In this case, when infrared light IL contained in sunlight is incident on the light control sheet 10 from outdoors, a component PL1 of the infrared light IL is reflected by the light control sheet 10 but a component PL2 is transmitted through the light control sheet 10 and the transparent plate 110 and enters the interior space defined by the transparent plate 110. The reflected light PL1 is a circularly polarized light component in the twist direction of the helical axis of the liquid crystal composition of the light control layer 20.

Consequently, the amount of the infrared light IL entering the interior space can be suppressed compared to the case where most of the infrared light IL is transmitted through the light control sheet 10 and the transparent plate 110. Therefore, temperature rise in the interior space can be suppressed.

When the light control sheet 10 is in the first state, visible light is transmitted through the light control sheet 10. Specifically, the light control sheet 10 is transparent. Accordingly, the interior space becomes brighter due to visible light entering the interior space. Also, the observer in the interior space can see outward via the light control sheet 10 and the transparent plate 110, or the observer outdoors can see the interior space via the light control sheet 10 and the transparent plate 110.

FIG. 6 shows the light control sheet 10 in the third state. In other words, the driving of the light control device 100 is in an on state. In this case, when the infrared light IL contained in sunlight is incident on the light control sheet 10 from outdoors, most of the infrared light IL enters the interior space. Therefore, temperature rise is promoted in the interior space.

When the light control sheet 10 is in the third state also, visible light is transmitted through the light control sheet 10. Accordingly, as in the first state of the light control sheet 10, the interior space becomes brighter, and the observers can view scenes beyond the light control sheet 10 and the transparent plate 110.

As described above, the degree of infrared light transmission, i.e., the degree of entry of infrared light into the interior space, can be changed by switching the state between the first and third states of the light control sheet 10. For this reason, for example, when temperature is high as in summer, temperature rise in the interior space can be suppressed by bringing the light control sheet 10 into the first state, and when temperature is low as in winter, temperature rise in the interior space can be promoted by bringing the light control 10 sheet into the third state. Thus, depending on the environment such as of temperature, the degree of infrared light transmission in the light control sheet 10 can be changed, and therefore decrease in cooling or heating efficiency can be suppressed.

In the infrared-cut sheets of the conventional art, increase in infrared light shielding function led to increase, etc. in the thickness of the metal layer, as a result of which, visible light transmittance tended to be lowed. In contrast, according to the light control sheet 10 of the present embodiment, visible light is favorably transmitted in both of the first and third states, and therefore the interior space can be prevented from becoming dark, regardless of the level of infrared light transmission. Thus, power consumption can be reduced by limiting the use of lighting in the interior space. Also, good visibility can be achieved for scenes beyond the transparent plate 110, regardless of the level of infrared light transmission.

Furthermore, infrared light and visible light are scattered when the light control sheet 10 is switched to the second state. Therefore, the degree of infrared light transmission is between the first and third states, and the light control sheet 10 appears to be turbid. Accordingly, by switching the light control sheet 10 to the second state, the degree of infrared light transmission can be moderated. Also, by switching the light control sheet 10 to the second state, viewing beyond the transparent plate 110, e.g., viewing the interior space from outdoors, can be prevented.

Even when the applied voltage is set to 0 V after switching the light control sheet 10 to the second state, the function of scattering infrared light and visible light can be maintained as in the second state. Accordingly, the degree of infrared light transmission can be moderated, while reducing power consumption, and visibility through the transparent plate 110 can also be reduced. For example, visibility of scenes beyond the transparent plate 110 can be switched making use of the first state and the state in which the applied voltage is set to 0 V after switching the light control sheet 10 to the second state, and the applied voltage at times other than switching can be 0 V.

In this way, by switching the light control sheet 10 between the first, third and second states, the effects of the light control sheet 10 on the interior space can be more diversely changed depending on the environment and situation.

The first embodiment can achieve the following effects.

(1) By changing the voltage applied to the light control sheet 10, the state can be switched between the first state in which the light control sheet reflects infrared light and passes visible light, the second state in which the light control sheet 10 scatters infrared light and visible light, and the third state in which the light control sheet 10 passes infrared light and visible light. Thus, since the degree of infrared light transmission in the light control sheet 10 can be changed, the degree of entry of infrared light into the indoor space facing the light control sheet 10 can be changed. Therefore, decrease in cooling or heating efficiency can be suppressed by suppressing or promoting temperature rise in the above space.

(2) Visible light is transmitted through the light control sheet 10 in the first state of reflecting infrared light. Therefore, compared to the infrared-cut sheets including metal layers, the above space is prevented from becoming dark and good visibility can be achieved for scenes beyond the light control sheet 10, even in the state in which entry of infrared light into the above space is suppressed.

(3) The helical pitch P (μm), ordinary light refractive index no, and extraordinary light refractive index ne of the liquid crystal composition in the light control sheet 10 satisfy the following Formula (1-1). Thus, the wavelength reflected by the liquid crystal composition, i.e., chiral nematic liquid crystals, can be reliably established in the infrared region.

$$0.8 \leq P \times (ne + 2no)/3 \leq 2.2 \quad (1\text{-}1)$$

(4) In the light control sheet 10 in the first state, the proportion of the area where the liquid crystal molecules 23 contained in the liquid crystal composition are horizontally aligned in the light control layer 20 is 50% or more. Thus, good reflectance can be achieved to infrared light.

(5) The proportion of the transparent polymer layer 21 in the light control layer 20 is less than 50%. Thus, the proportion of the liquid crystal composition is sufficiently ensured in the light control layer 20, and good reflectance can be achieved to infrared light in the first state.

(6) The refractive index np of the polymer material constituting the transparent polymer layer 21 and the ordinary light refractive index no of the liquid crystal composition satisfy the following Formula (2-1). Thus, in the third state, infrared light can easily travel straight through the light control layer 20, and therefore the infrared light transmittance can be increased.

$$0.98 \leq np/no \leq 1.02 \quad (2\text{-}1)$$

(7) The infrared light reflectance of the transparent support layers 41 and 42 is less than 15%. Thus, infrared light transmittance can be increased in the third state.

(8) The light control sheet 10 includes the alignment layers 51 and 52. Thus, the proportion of the horizontally aligned liquid crystal molecules 23 can be increased in the first state. Accordingly, infrared light reflectance can be increased in the first state.

Second Embodiment

Figure 7:
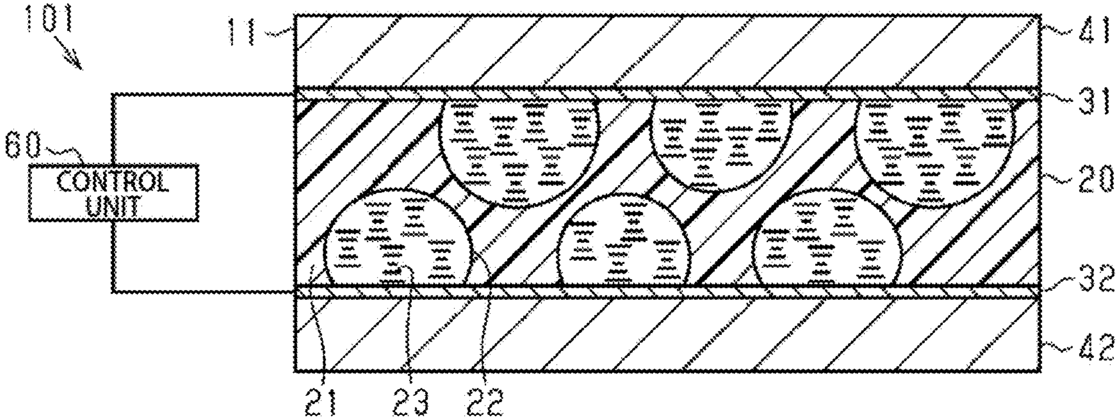
FIG. 7 is a diagram illustrating a light control device including a light control sheet in a first state according to a second embodiment of the present invention.
Figure 8:
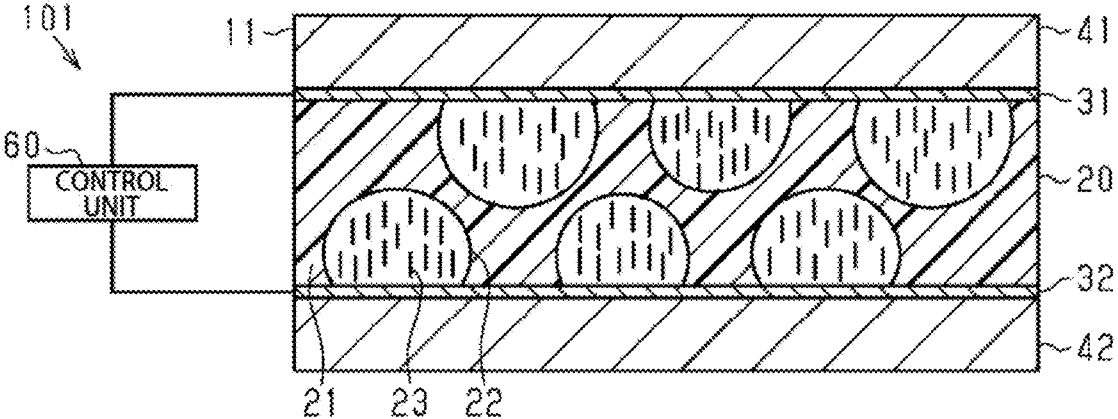
FIG. 8 is a diagram illustrating the light control device including the light control sheet in a third state according to the second embodiment of the present invention.
Figure 9:
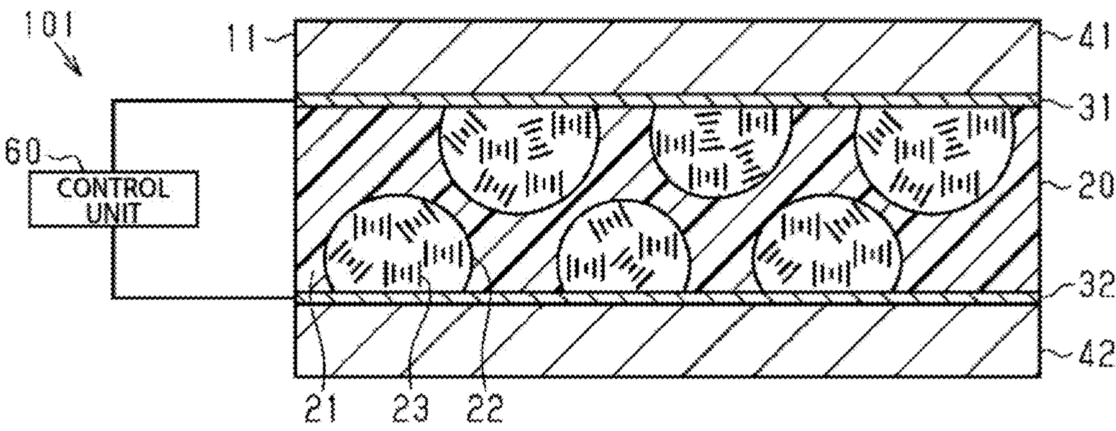
FIG. 9 is a diagram illustrating the light control device including the light control sheet in a second state according to the second embodiment of the present invention.

Referring to FIGS. 7 to 9, a second embodiment of a light control device and a light control sheet will be described. The second embodiment is different from the first embodiment in the layer configuration of the light control sheet. In the following, description is focused on the differences of the second embodiment from the first embodiment, and components similar to those of the first embodiment are given the same reference signs to omit repeated explanations.

As shown in FIG. 7, a light control sheet 11 according to the second embodiment does not include the alignment layers 51 and 52. The light control layer 20 is sandwiched between the first transparent electrode layer 31 and the second transparent electrode layer 32, in the state of being in contact with them. The light control sheet 11 of the second embodiment, for which the alignment layers are not required, can simplify the production processing of the light control sheet or reduce the cost required for the production, compared to the first embodiment.

The materials and characteristics of the light control layer 20, transparent electrode layers 31 and 32, and transparent support layers 41 and 42 are similar to those of the first embodiment. Specifically, in the second embodiment also, the light control layer 20 contains the transparent polymer layer 21 and the liquid crystal composition, i.e., chiral nematic liquid crystals, having positive dielectric anisotropy. The helical pitch P (μm), ordinary light refractive index no, and extraordinary light refractive index ne of the liquid crystal composition satisfy the following Formula (1-1).

$$0.8 \leq P \times (ne + 2no)/3 \leq 2.2 \quad (1\text{-}1)$$

The helical pitch P (μm), ordinary light refractive index no, and extraordinary light refractive index ne of the liquid crystal composition are preferred to satisfy the following Formula (1-2).

$$0.9 \leq P \times (ne + 2no)/3 \leq 1.1 \quad (1\text{-}2)$$

In a light control device 101 of the second embodiment also, the voltage applied between the transparent electrode layers 31 and 32 is controlled by the control unit 60 to any of the first voltage V1, second voltage V2, and third voltage V3. Similarly to the first embodiment, the first voltage V1 is 0 V, the second voltage V2 is greater than the first voltage V1, and the third voltage V3 is greater than the second voltage V2. Thus, the light control sheet 11 is controlled to any of the first state, second state, and third state.

FIG. 7 schematically illustrates the light control sheet 11 in the first state. In the first state, the voltage applied between the transparent electrode layers 31 and 32 is controlled to the first voltage V1, and the liquid crystal composition exhibits a planar state. With the above Formula (1-1) being satisfied, the light control sheet 11 selectively reflects infrared light in the first state. Also, visible light is transmitted through the light control sheet 11 in the first state.

Since the light control sheet 11 of the second embodiment does not include the alignment layers 51 and 52, the proportion of the horizontally aligned liquid crystal molecules 23 is lower in the first state, compared to the first embodiment. However, if the liquid crystal molecules 23 are horizontally aligned in 50% or more of the area of the light control layer 20, good reflectance can be achieved for infrared light. If at least chiral nematic liquid crystals are used for the alignment layers 51 and 52, the liquid crystal molecules 23 can be horizontally aligned in 50% or more of the area when no voltage is applied.

FIG. 8 schematically illustrates the light control sheet 11 in the third state. In the third state, the voltage applied between the transparent electrode layers 31 and 32 is controlled to the third voltage V3, and the liquid crystal composition exhibits a homeotropic state. In the third state, infrared light and visible light are transmitted through the light control sheet 11.

In order to prevent the traveling direction of infrared light from deviating in the light control layer 20, the refractive index np of the polymer material for the infrared wavelength and the ordinary light refractive index no of the liquid crystal composition are preferred to satisfy the following Formula (2-1).

$$0.98 \leq np/no \leq 1.02 \tag{2-1}$$

FIG. 9 schematically illustrates the light control sheet 11 in the second state. In the second state, the voltage applied between the transparent electrode layers 31 and 32 is controlled to the second voltage V2, and the liquid crystal composition exhibits a focal conic state. In the second state, infrared light and visible light incident on the light control sheet 11 are scattered.

The change from the first state to the second state and the change from the second state to the third state are possible only in one direction, and the change between the first state and the third state is possible in both directions.

The light control device 101 and the light control sheet 11 of the second embodiment operate as in the first embodiment. Specifically, by switching the light control sheet 11 affixed to a transparent plate to the first state, infrared light is prevented from entering the interior space defined by the transparent plate, by which temperature rise can be suppressed in the interior space. Also, by switching the light control sheet 11 to the third state, most of infrared light is allowed to enter the interior space, by which temperature rise can be promoted in the interior space.

Furthermore, by switching the light control sheet 11 to the second state, the degree of infrared light transmission can be moderated, and visibility beyond the transparent plate can be reduced. Therefore, the effects of the light control sheet 11 on the interior space can be more diversely changed.

According to the second embodiment, the following effects can be achieved in addition to the effects (1) to (7) of the first embodiment.

(9) Since the light control sheet 11 includes no alignment layers, the production processing of the light control sheet 11 can be simplified, or the cost required for the production can be reduced.

Third Embodiment

Figure 10:
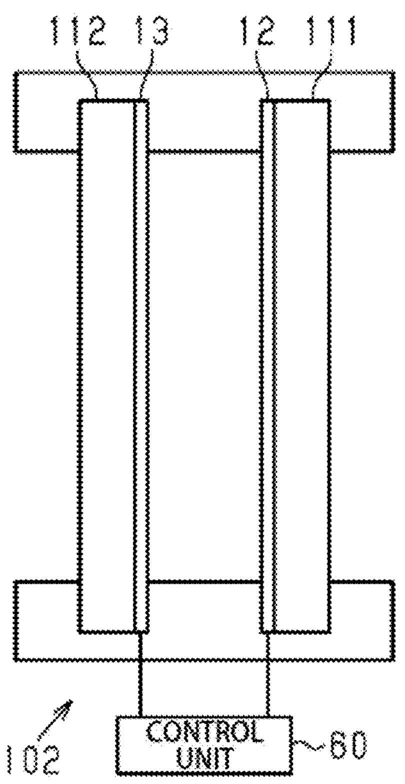
FIG. 10 is a diagram illustrating a light control device according to a third embodiment of the present invention together with transparent plates.
Figure 11:
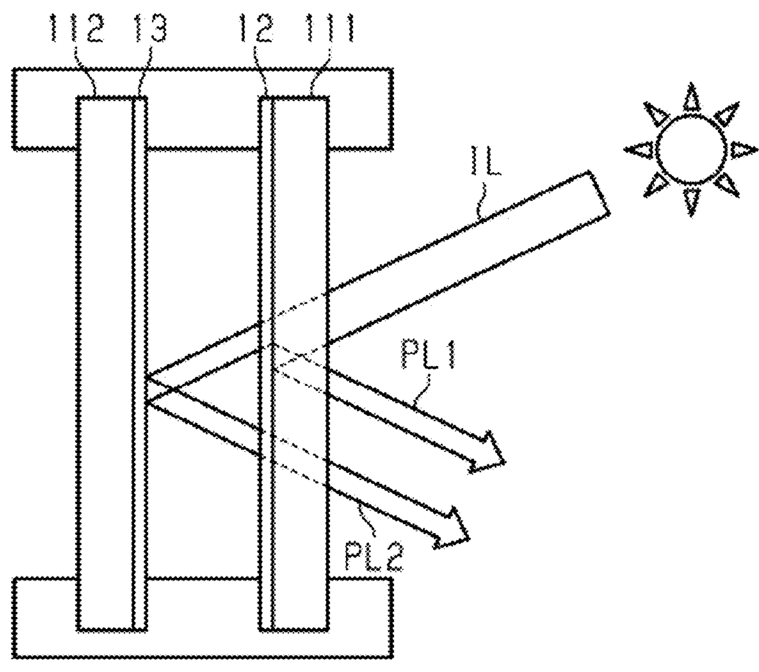
FIG. 11 is a diagram illustrating a usage mode of the two light control sheets in the first state according to a third embodiment of the present invention.
Figure 12:
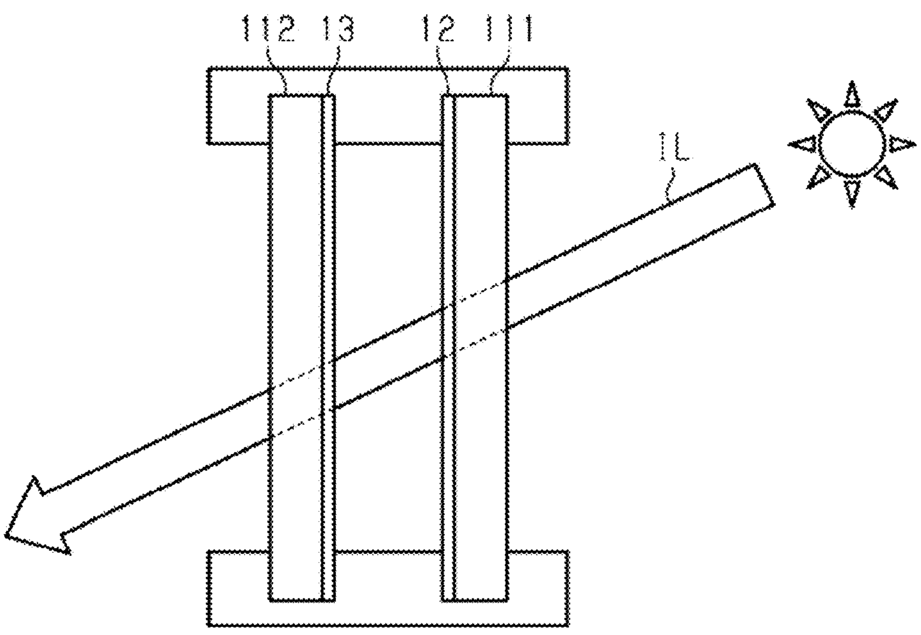
FIG. 12 is a diagram illustrating a usage mode of the two light control sheets in the third state according to the third embodiment of the present invention.

Referring to FIGS. 10 to 12, a third embodiment of a light control device will be described. In the following, description is focused on the differences of the third embodiment from the first and second embodiments, and components similar to those of the first and second embodiments are given the same reference signs to omit repeated explanations.

As shown in FIG. 10, a light control device 102 according to the third embodiment includes two light control sheets, i.e., a first light control sheet 12 and a second light control sheet 13. The configuration of the light control sheet 10 of the first embodiment may be applied to each of the light control sheets 12 and 13, or the configuration of the light control sheet 11 of the second embodiment may be applied thereto.

The first and second light control sheets 12 and 13 are disposed together with respective transparent plates at the boundary between the interior of a building or mobile object such as a vehicle and the outdoors, in such a manner that the light control sheets 12 and 13 are superimposed with each other in their thickness direction. The two light control sheets 12 and 13 may be in contact with or separate from each other.

For example, in FIG. 10, the first and second light control sheets 12 and 13 are affixed to the respective transparent plates, separately. Specifically, the first light control sheet 12 is affixed to a first transparent plate 111, and the second light control sheet 13 is affixed to a second transparent plate 112, with the first and second light control sheets 12 and 13 facing each other. The first and second transparent plates 111 and 112 may, for example, be double glass used in windows. In a mode in which the light control sheets 12 and 13 are attached to a window having a heat insulating function, the heat insulating function can be even more enhanced by having infrared light reflected by the light control sheets 12 and 13.

Without being limited to the above mode, the first light control sheet 12 affixed to the first transparent plate 111 may face away from the second light control sheet 13 and the second transparent plate 112. Also, the second light control sheet 13 affixed to the second transparent plate 112 may face away from the first light control sheet 12 and the first transparent plate 111. The first and second light control sheets 12 and 13 may be affixed to the front and rear surfaces of a single transparent plate.

The optical rotation of the liquid crystal composition of the light control layer 20 provided to the first light control sheet 12 is different from the optical rotation of the liquid crystal composition of the light control layer 20 provided to the second light control sheet 13. For example, the liquid crystal composition of the first light control sheet 12 may have a right optical rotation, and the liquid crystal composition of the second light control sheet 13 may have a left optical rotation. In the first and second light control sheets 12 and 13, the chiral agents contained in the respective liquid crystal compositions may have optical rotations different from each other, so that the optical rotations of the liquid crystal compositions can be different from each other.

The control unit 60 of the light control device 102 may control the voltage applied to the first light control sheet 12 and the voltage applied to the second light control sheet 13 such that the light control sheets 12 and 13 are interlocked, or may independently control the voltages of the light control sheets 12 and 13. The processing performed by the control unit 60 includes bringing the first and second light control sheets 12 and 13 into the first state, and bringing the first and second light control sheets 12 and 13 into the third state.

FIG. 11 illustrates the first and second light control sheets 12 and 13 both in the first state. When the first and second light control sheets 12 and 13 are in the first state, they reflect circularly polarized light components rotating in directions different from each other due to the difference in optical rotation of the liquid crystal compositions.

For example, infrared light IL contained in sunlight is incident on the second transparent plate 112 from the side where the first transparent plate 111 is located. In this case, when the infrared light IL is incident on the first light control sheet 12, a component PL1 of the infrared light IL is reflected by the first light control sheet 12. The rest of the light is transmitted through the first light control sheet 12 and is incident of the second light control sheet 13, so that light PL2 is reflected by the second light control sheet 13. The light PL1 and the light PL2 are circularly polarized light components rotating in directions different from each other. For example, when the liquid crystal composition of the first light control sheet 12 has a right optical rotation, and the liquid crystal composition of the second light control sheet 13 has a left optical rotation, the light PL1 is a right circularly polarized light component, and the light PL2 is a left circularly polarized light component.

According to the third embodiment, circularly polarized light components different from each other are reflected by the two light control sheets 12 and 13, and therefore more components of the infrared light are reflected by the light control sheets 12 and 13, compared to the first and second embodiments. Accordingly, the amount of the infrared light entering the interior space defined by the transparent plates 111 and 112 can be further suppressed, and therefore temperature rise in the interior space can be more reliably suppressed.

The set value of the reflected wavelength of the first light control sheet 12 may match or may differ from the set value of the reflected wavelength of the second light control sheet 13. The set value of the reflected wavelength is calculated from the formula P×(ne+2no)/3 for specifying a reflected wavelength. In other words, the peak wavelength of the reflected light of the first light control sheet 12 in the first state may match or may differ from the peak wavelength of the reflected light of the second light control sheet 13 in the second state.

If the peak wavelengths of the reflected light of the two light control sheets 12 and 13 match each other, the infrared light reflectance in the wavelength region centered around these peak wavelengths can be suitably increased. On the other hand, if the peak wavelengths of the two light control sheets 12 and 13 differ from each other, infrared light can be reflected over a wide wavelength region because the infrared light in the wavelength region near each peak wavelength is reflected. For example, in the infrared light contained in solar radiation, the wavelength region in the range of 800 nm to 1,300 nm has a large amount of solar radiation. Therefore, by setting the reflected wavelengths of the two light control sheets 12 and 13 such that the peak wavelengths are dispersed in this range, solar reflectance can be suitably increased.

When the light control sheets 12 and 13 are in the first state, visible light is transmitted through the light control sheets 12 and 13. Accordingly, the interior space is prevented from becoming dark, and the observers can view scenes beyond the light control sheets 12 and 13 and the transparent plates 111 and 112.

FIG. 12 illustrates the first and second light control sheets 12 and 13 both in the third state. In this case, both of the first and second light control sheets 12 and 13 pass infrared light. Therefore, most of the infrared light IL from outdoors enters the interior space. Consequently, temperature rise is promoted in the interior space.

When the light control sheets 12 and 13 are in the third state also, visible light is transmitted through the light control sheets 12 and 13, and therefore the interior space is prevented from becoming dark, and the observers can view scenes beyond the light control sheets 12 and 13 and the transparent plates 111 and 112.

As described above, the state in which the two light control sheets 12 and 13 are both in the first state can be switched to the state in which the two light control sheets 12 and 13 are both in the third state, or vice versa, so that the degree of infrared light transmission, i.e., the degree of entry of infrared light into the interior space, can be changed. In the third embodiment, entry of infrared light into the interior space can be even more suppressed than in the first and second embodiments by switching the state of both of the two light control sheets 12 and 13 to the first state, and therefore a strong effect of suppressing temperature rise can be achieved in the interior space. Therefore, decrease of cooling efficiency in summer can be further suppressed.

If the voltages applied to the first and second light control sheets 12 and 13 can be separately controlled, one of the first and second light control sheets 12 and 13 can be brought into the first state, and the other of them can be brought into the third state to thereby moderate the degree of infrared light transmission. Thus, the degree of infrared light transmission can be changed more finely.

Furthermore, the degree of infrared light transmission can be even more finely controlled or visibility through the transparent plates 111 and 112 can be reduced, by switching at least one of the first and second light control sheets 12 and 13 to the second state. Accordingly, the effects of the light control sheets 12 and 13 on the interior space can be more diversely changed.

The third embodiment can achieve the following effects.

(10) The light control device 102 includes the two light control sheets 12 and 13 having optical rotations different from each other, and these light control sheets 12 and 13 are disposed so as to be superimposed in the thickness direction. Thus, by bringing the two light control sheets 12 and 13 into the first state, circularly polarized components different from each other are reflected, and therefore more components of the infrared light are reflected by the light control sheets 12 and 13. Accordingly, the amount of infrared light entering the indoor space facing the light control sheets 12 and 13 can be further reduced.

(11) If the peak wavelength of the reflected light of the first light control sheet 12 in the first state matches the peak wavelength of the reflected light of the second light control sheet 13 in the first state, the infrared light reflectance in the wavelength region centered around these peak wavelengths can be increased.

(12) If the peak wavelength of the reflected light of the first light control sheet 12 in the first state is different from the peak wavelength of the reflected light of the second light control sheet 13 in the first state, infrared light can be reflected over a wide wavelength region because the infrared light in the wavelength region near each peak wavelength is reflected.

EXAMPLES

The light control device and the light control sheet described above will be explained using specific examples and comparative examples.

Example 1

A light control sheet including a light control layer, two transparent electrode layers, two transparent support layers, and two alignment layers was prepared. The material for forming the transparent electrode layers was indium tin oxide, the material for forming the transparent support layers was polyethylene terephthalate, and the material for forming the alignment layers was polyimide. The light control layer was of a polymer network type, and formed such that the parameters would be as follows.

Dielectric anisotropy $\Delta\varepsilon$ of liquid crystal composition: 10.9

Ordinary light refractive index no of liquid crystal composition: 1.51

Extraordinary light refractive index ne of liquid crystal composition: 1.68

Refractive index np of polymer material forming transparent polymer layer: 1.50

Helical pitch P of liquid crystal composition: 0.66 μm

Set value of reflected wavelength (P×(ne+2no)/3): 1.03 μm

Proportion of transparent polymer layer in light control layer: 12.6%.

Example 2

A light control sheet of Example 2 was prepared using materials similar to those of Example 1, except that no alignment layers were formed. Specifically, the parameters of the light control layer of Example 2 were the same as those of Example 1.

Polarized Light Microscopy

Figure 13:
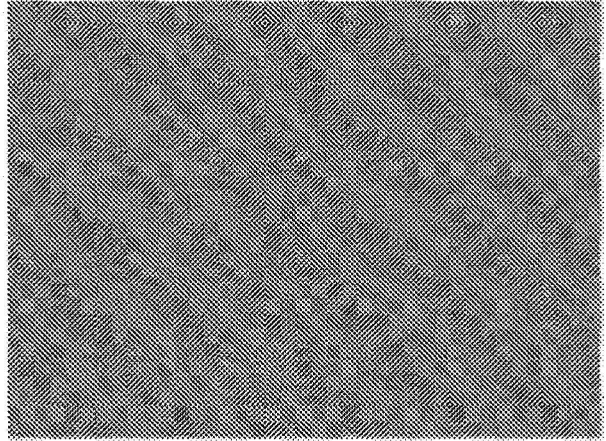
FIG. 13 shows an image of a light control sheet according to Example 1 observed under a polarizing microscope.
Figure 14:
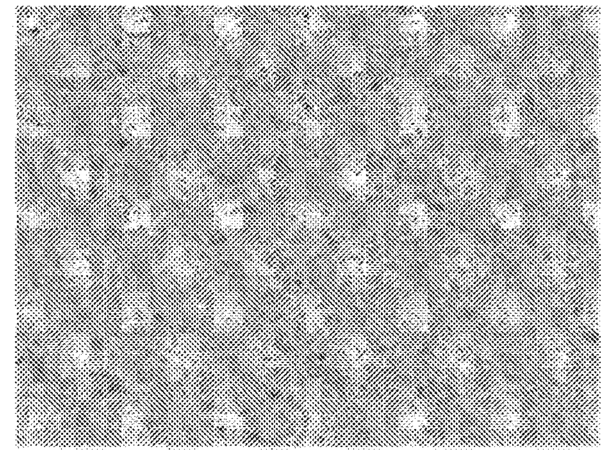
FIG. 14 shows an image of a light control sheet according to Example 2 observed under a polarizing microscope.

For Examples 1 and 2, the light control sheet when the applied voltage was 0 V, i.e., in the first state, was observed using a polarizing microscope. FIG. 13 shows an observed image of Example 1, and FIG. 14 shows an observed image of Example 2. The observation magnification is 200×.

As a result of analyzing colors in the observed images using a polarizing microscope, it was confirmed that, in Example 1, the liquid crystal molecules were horizontally aligned in nearly 90% of the area in the light control layer, and, in Example 2, the liquid crystal molecules were horizontally aligned in 50% or more of the area. From this, it was confirmed that, due to the light control sheet including the alignment layers, most of the liquid crystal molecules were horizontally aligned in the first state. It was confirmed that, even if the light control sheet included no alignment layers, the liquid crystal molecules were horizontally aligned in 50% or more of the area in the first state.

Reflection Characteristics Analysis

For the light control sheets of Examples 1 and 2, the wavelength region and reflectance of reflected light were measured when the applied voltage was 0 V and 50 V. When the applied voltage is 0 V, the light control sheet is in the first state, and when the applied voltage is 50 V, the light control sheet is in the third state. The applied voltage is an AC voltage of 50 Hz. The measurement results are shown in FIG. 15.

Figure 15:
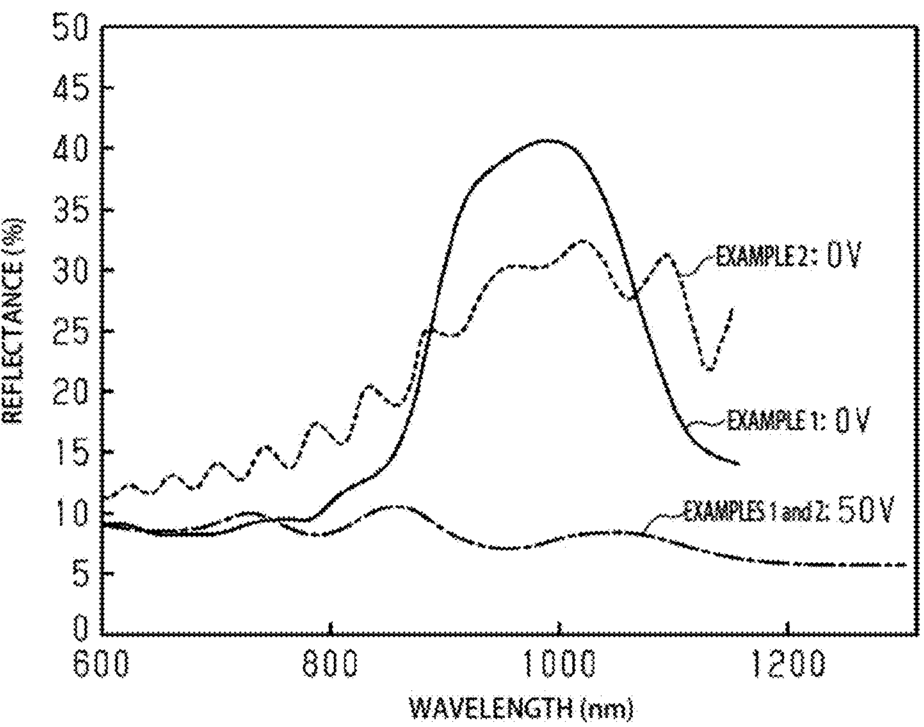
FIG. 15 is a graph showing reflection characteristics to infrared light of the light control sheets according to Examples 1 and 2.

As shown in FIG. 15, when the applied voltage is 0 V, reflection having a peak in the vicinity of 1,000 nm is achieved in both of Examples 1 and 2. Accordingly, it was confirmed that, in both of Examples 1 and 2, selective infrared light reflection could be achieved in the first state. This peak wavelength of the reflected light substantially matches the above set value of reflected wavelength. The half width of the peak is 200 nm to 300 nm.

However, when the applied voltage was 50 V, selective infrared light reflection was observed in neither of Examples 1 and 2, but it was observed that, in the third state, infrared light was transmitted through the light control sheet.

Comparing Example 1 with Example 2 when the applied voltage is 0 V, Example 1 having the alignment layers achieves a high reflectance in the infrared region centered around the peak wavelength. Furthermore, the reflectance at the peak wavelength is approximately 40% in Example 1, and approximately 30% in Example 2. From this data, it was indicated that the light control sheet including the alignment layers made it possible to more reliably reflect infrared light. The reason why the reflectance at the peak wavelength is less than 50% even in Example 1 is considered to be because the horizontal alignment of the liquid crystal molecules is disturbed due to the light control layer including the transparent polymer layer.

Figure 16:
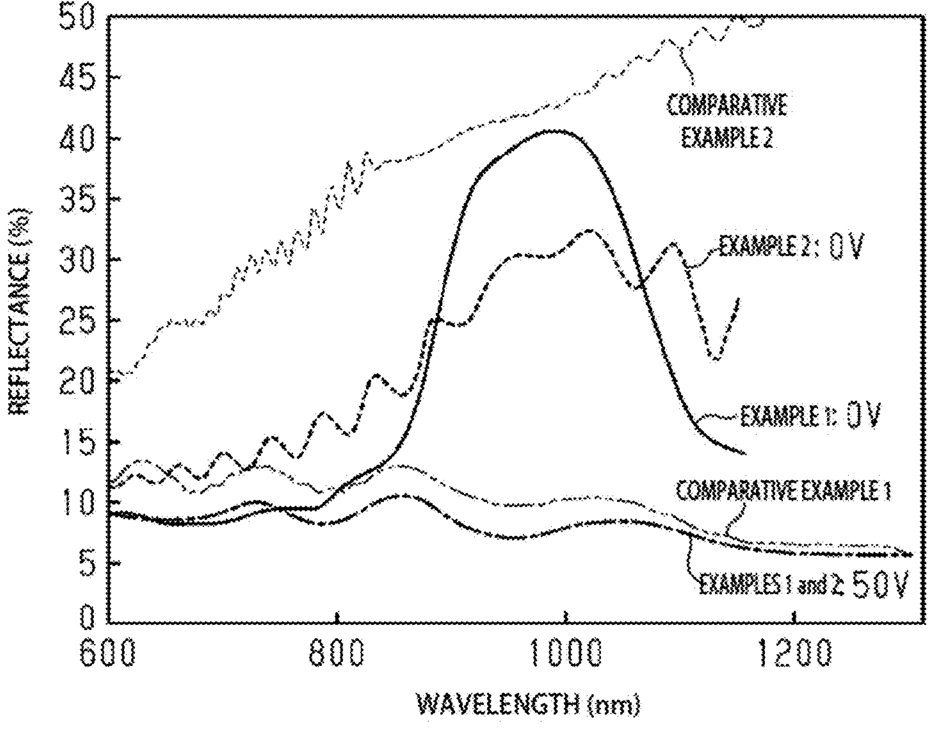
FIG. 16 is a graph showing reflection characteristics to infrared light of the light control sheets according to Examples 1 and 2 and Comparative Examples 1 and 2.

Next, the wavelength region and reflectance of reflected light were measured for comparative examples of infrared-cut sheets. The measurement results are shown in FIG. 16 together with the measurement results of the examples. The infrared-cut sheets of Comparative Examples 1 and 2 are both commercially available products. The infrared-cut sheet of Comparative Example 1 is a transparent heat-insulating film (IR-90HD manufactured by LINTEC Corporation), and the infrared-cut sheet of Comparative Example 2 is a mirror heat-insulating film including a metal layer (SL-18-25HD manufactured by LINTEC Corporation).

Solar reflectance was calculated for Examples 1 and 2 and Comparative Examples 1 and 2. The solar reflectance was calculated according to JIS R 3106:2019. The results are shown in Table 1.

TABLE 1

| | Example 1 | | Example 2 | | Comparative Example 1 | Comparative Example 2 |
|---|---|---|---|---|---|---|
| Applied voltage | 0 V | 50 V | 0 V | 50 V | — | — |
| Solar reflectance | 20.8% | 8.5% | 19.7% | 8.5% | 10.9% | 32.1% |

As shown in FIG. 16, the infrared light reflectance of Comparative Example 1 is lower than the case where the applied voltage is 0 V as in Examples 1 and 2, and the effect of shielding infrared light is small. However, the infrared light reflectance of Comparative Example 2 is high compared to the case where the applied voltage is 0 V as in Examples 1 and 2, and the effect of shielding infrared light is high. Similar results can be seen in the solar reflectance shown in Table 1. Higher solar reflectance indicates that the infrared light reflection in the wavelength region included in solar radiation is higher, i.e., the heat-shielding effect of the sheet is higher.

However, Comparative Example 2, as suggested by the fact that it is a mirror heat-insulating film, shows high reflectance even in the visible region, and it is estimated that the interior space will become dark if the sheet of Comparative Example 2 is affixed to window glass. In contrast, the light control sheets of Examples 1 and 2 can achieve both of high infrared light reflectance and high visible light transmittance.

In Comparative Examples 1 and 2, the degree of infrared light transmission cannot be changed. In contrast, as is apparent from FIG. 16 and Table 1, in Examples 1 and 2, the magnitude of infrared light reflection and the magnitude of solar reflectance can be changed by changing the applied voltage. Specifically, according to Examples 1 and 2, the degree of infrared light transmission in the sheets can be changed, whereby the level of heat-shielding effect can be changed.

Example 3

A first light control sheet including a light control layer, two transparent electrode layers, two transparent support layers, and two alignment layers was prepared. The material for forming the transparent electrode layers was indium tin oxide, the material for forming the transparent support layers was polyethylene terephthalate, and the material for forming the alignment layers was polyimide. The light control layer was of a polymer network type, and formed such that the parameters would be as follows.

Dielectric anisotropy Δε of liquid crystal composition: 10.9

Ordinary light refractive index no of liquid crystal composition: 1.51

Extraordinary light refractive index ne of liquid crystal composition: 1.68

Refractive index np of polymer material forming transparent polymer layer: 1.50

Helical pitch P of liquid crystal composition: 0.66 μm

Set value of reflected wavelength (P×(ne+2no)/3): 1.03 μm

Proportion of transparent polymer layer in light control layer: 12.6%.

Optical rotation of chiral agent: Right optical rotation

A second light control sheet was prepared using materials similar to those of the first light control sheet, except that a chiral agent having a left optical rotation was used. Specifically, the parameters of the light control layer in the second light control sheet were the same as those of the first light control sheet, except for the optical rotation of the chiral agent.

Example 4

A first light control sheet including a light control layer, two transparent electrode layers, two transparent support layers, and two alignment layers was prepared. The material for forming the transparent electrode layers was indium tin oxide, the material for forming the transparent support layers was polyethylene terephthalate, and the material for forming the alignment layers was polyimide. The light control layer was of a polymer network type, and formed such that the parameters would be as follows.

Dielectric anisotropy Δε of liquid crystal composition: 10.9

Ordinary light refractive index no of liquid crystal composition: 1.51

Extraordinary light refractive index ne of liquid crystal composition: 1.68

Refractive index np of polymer material forming transparent polymer layer: 1.50

Helical pitch P of liquid crystal composition: 0.57 μm

Set value of reflected wavelength (P×(ne+2no)/3): 0.90 μm

Proportion of transparent polymer layer in light control layer: 12.6%.

Optical rotation of chiral agent: Right optical rotation

A second light control sheet was prepared using materials similar to those of the first light control sheet, except that a chiral agent having left optical rotation was used, and the helical pitch P of the liquid crystal composition and the set value of the reflected wavelength were changed. The parameters of the light control layer in the second light control sheet were as shown below.

Dielectric anisotropy Δε of liquid crystal composition: 10.9

Ordinary light refractive index no of liquid crystal composition: 1.51

Extraordinary light refractive index ne of liquid crystal composition: 1.68

Refractive index np of polymer material forming transparent polymer layer: 1.50

Helical pitch P of liquid crystal composition: 0.70 μm

Set value of reflected wavelength (P×(ne+2no)/3): 1.10 μm

Proportion of transparent polymer layer in light control layer: 12.6%.

Optical rotation of chiral agent: Left optical rotation

Reflection Characteristics Analysis

Figure 17:
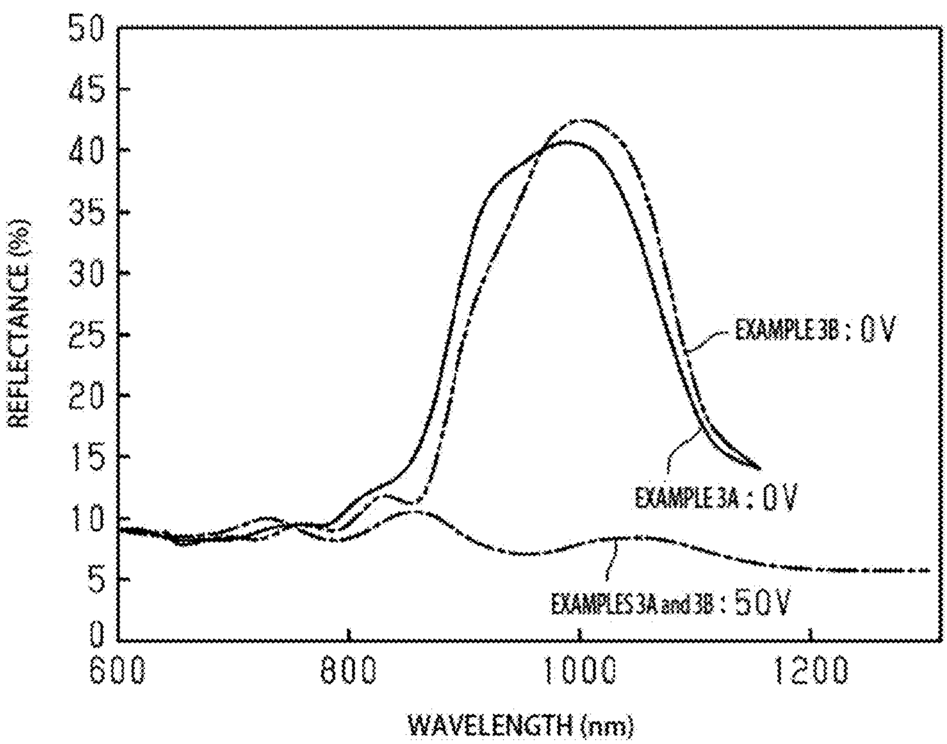
FIG. 17 is a graph showing reflection characteristics to infrared light of two light control sheets according to Example 3.
Figure 18:
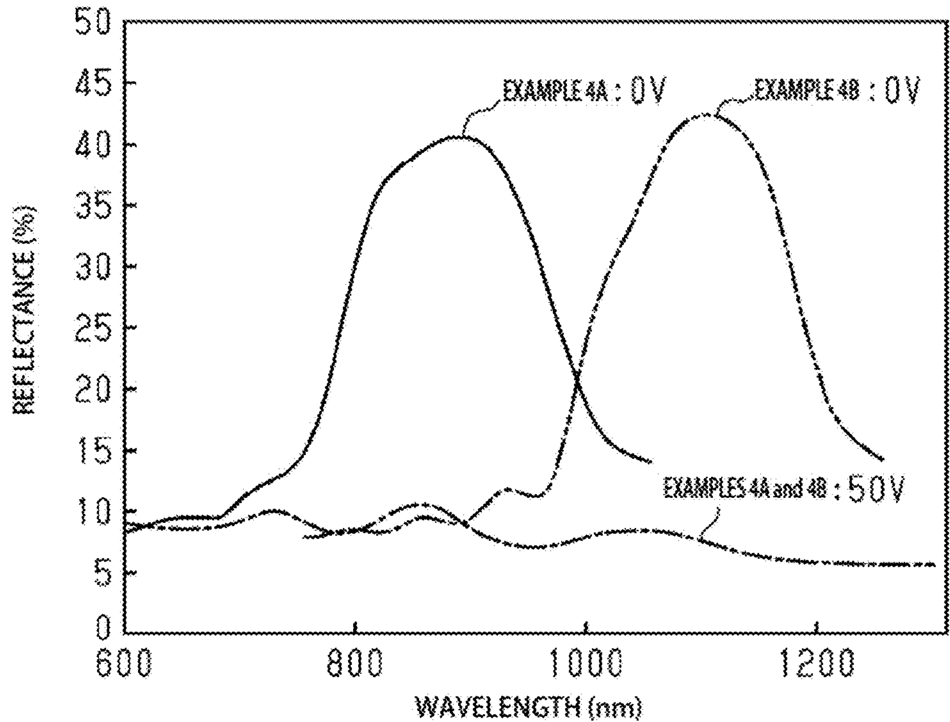
FIG. 18 is a graph showing reflection characteristics to infrared light of two light control sheets according to Example 4.

For the light control sheets of Examples 3 and 4, the wavelength region and reflectance of reflected light were measured when the applied voltage was 0 V and 50 V. When the applied voltage is 0 V, the light control sheet is in the first state, and when the applied voltage is 50 V, the light control sheet is in the third state. The measurement results of Example 3 are shown in FIG. 17, and the measurement results of Example 4 are shown in FIG. 18. In FIG. 17, Example 3A is the first light control sheet, and Example 3B is the second light control sheet. In FIG. 18, Example 4A is the first light control sheet, and Example 4B is the second light control sheet.

As shown in FIG. 17, in Example 3, when the applied voltage is 0 V, reflection having a peak in the vicinity of 1,000 nm is achieved in both of the two light control sheets. Each peak wavelength of the reflected light substantially matches the above set value of reflected wavelength. The half width of the peak is 200 nm to 300 nm, and the reflectance at the peak wavelength is approximately 40%.

However, when the applied voltage is 50 V, selective infrared light reflection is not observed in neither of the two light control sheets.

As shown in FIG. 18, in Example, 4, when the applied voltage is 0 V, reflection having a peak in the vicinity of 900 nm is achieved in the first light control sheet, and reflection having a peak in the vicinity of 1,100 nm is achieved in the second light control sheet2. In each light control sheet, the peak wavelength of the reflected light substantially matches the above set value of reflected wavelength. The half width of the peak is 200 nm to 300 nm, and the reflectance at the peak wavelength is approximately 40%.

However, when the applied voltage is 50 V, selective infrared light reflection is not observed in neither of the two light control sheets.

These results imply that, using the first and second light control sheets of Example 3 superimposed with each other, infrared light reflection with a wavelength around 1,000 nm can be intensified in the first state. Furthermore, it is implied that, using the first and second light control sheets of Example 4 superimposed with each other, infrared light over a wider wavelength region can be reflected in the first state.

For examples 3 and 4, solar reflectance was calculated for a laminate in which the first and second light control sheets were superimposed with each other. The solar reflectance was calculated according to JIS K 5602. The results are shown in Table 2.

TABLE 2

| | Example 3 | | Example 4 | |
|---|---|---|---|---|
| Applied voltage | 0 V | 50 V | 0 V | 50 V |
| Solar reflectance | 37.2% | 16.3% | 37.7% | 16.3% |

As shown in Table 2, when the applied voltage is 0 V, solar reflectance higher than in Examples 1 and 2 shown in Table 1 is achieved in both of Examples 3 and 4, and further, solar reflectance higher than in Comparative Example 2 is achieved. Accordingly, it was indicated that, using two light control sheets containing respective liquid crystal compositions with different optical rotations superimposed with each other, solar reflectance can be increased, and high heat-shielding effect can be achieved.

In Examples 3 and 4, solar reflectance when the applied voltage is 50 V is also higher than in Examples 1 and 2. Accordingly, it can be said that, if emphasis is placed on the effect of infrared light reflection of the light control sheet in the first state, as in the case where emphasis is placed on suppressing temperature rise in the interior space in summer, it is suitable to use two light control sheets superimposed with each other as in Examples 3 and 4. Also, if emphasis is placed on the effect of infrared light transmission of the light control sheet in the third state, as in the case where emphasis is placed on promoting temperature rise in the interior space in winder, it is suitable to use a single light control sheet as in Examples 1 and 2.

Modifications

The embodiments described above can be modified and implemented as follows. The following modifications may be implemented in combination.

The light control device may control the light control sheet to either of the first and third states and does not have to switch the light control sheet to the second state. In other words, the processing performed by the control unit 60 may include controlling the voltage applied between the transparent electrode layers 31 and 32 to the first voltage V1 to bring the light control sheet into the first state, and controlling the voltage applied between the transparent electrode layers 31 and 32 to the third voltage V3 to bring the light control sheet into the third state, and does not have to include controlling the voltage applied between the transparent electrode layers 31 and 32 to the second voltage V2 to bring the light control sheet into the second state. If the state can be switched between the first and third states, the state in which infrared light is reflected by the light control sheet can be switched to the state in which infrared light is transmitted therethrough, or vice versa, and therefore the degree of infrared light transmission of the light control sheet can be changed.

In the third embodiment, if the peak wavelengths of reflected light are different from each other between the two light control sheets 12 and 13 in the first state, the optical rotations of the liquid crystal compositions of these light control sheets 12 and 13 may match each other. In this case also, the infrared light in the wavelength region near the peak wavelength of each of the light control sheets 12 and 13 is reflected, and therefore infrared light can be reflected over a wider wavelength region than in the case where a single light control sheet is used.

There are infrared-cut sheets used for heat shielding. Infrared-cut sheets affixed to the window glass of vehicles or buildings prevent infrared light contained in sunlight from penetrating the sheets and entering the interior of the vehicles or indoors. This can prevent temperature rise in the vehicles or indoors. For example, the infrared-cut sheet described in JP 2018-205440 A includes a metal layer and a metal oxide layer to reflect infrared light.

The infrared light shielding function of infrared-cut sheets is constantly effective. Therefore, if infrared-cut sheets are attached to the window glass of vehicles or buildings, transmission of infrared light is prevented, regardless of the temperature or season, so that temperature rise is prevented in the interior of the vehicles or indoors. Consequently, although cooling efficiency is expected to be improved in summer, heating efficiency may be deteriorated in winter.

A light control device according to an embodiment of the present invention includes a light control sheet; and a control unit that controls application of a voltage to the light control sheet. The light control sheet includes a first transparent electrode layer, a second transparent electrode layer, and a light control layer provided between the first transparent electrode layer and the second transparent electrode layer, the light control layer containing a transparent polymer layer defining multiple voids therein, and a liquid crystal composition retained in the voids and comprising chiral nematic liquid crystals having positive dielectric anisotropy; and processing performed by the control unit includes controlling a voltage applied between the first transparent electrode layer and the second transparent electrode layer to a first voltage to bring the light control sheet into a first state in which infrared light is reflected and visible light is transmitted, controlling a voltage applied between the first transparent electrode layer and the second transparent electrode layer to a second voltage greater than the first voltage to bring the light control sheet into a second state in which infrared light and visible light are scattered, and controlling a voltage applied between the first transparent electrode layer and the second transparent electrode layer to a third voltage greater than the second voltage to bring the light control sheet into a third state in which infrared light and visible light are transmitted. A light control sheet according to an embodiment of the present invention includes a first transparent electrode layer; a second transparent electrode layer; and a light control layer provided between the first transparent electrode layer and the second transparent electrode layer, the light control layer containing a transparent polymer layer defining multiple voids therein, and a liquid crystal composition retained in the voids and comprising chiral nematic liquid crystals having positive dielectric anisotropy. The light control sheet includes a first state in which the liquid crystal composition exhibits a planar state due to a voltage applied between the first transparent electrode layer and the second transparent electrode layer being controlled to a first voltage, so that the light control sheet reflects infrared light and transmits visible light, a second state in which the liquid crystal composition exhibits a focal conic state due to a voltage applied between the first transparent electrode layer and the second transparent electrode layer being controlled to a second voltage greater than the first voltage, so that the light control sheet scatters infrared light and visible light, and a third state in which the liquid crystal composition exhibits a homeotropic state due to a voltage applied between the first transparent electrode layer and the second transparent electrode layer being controlled to a third voltage greater than the second voltage, so that the light control sheet transmits infrared light and visible light; and a helical pitch P (μm), an ordinary light refractive index no, and an extraordinary light refractive index ne of the liquid crystal composition satisfy the following Formula (1-1):

$$0.8 \leq P \times (ne + 2no)/3 \leq 2.2 \tag{1-1}$$

Obviously, numerous modifications and variations of the present invention are possible in light of the above teachings. It is therefore to be understood that within the scope of the appended claims, the invention may be practiced otherwise than as specifically described herein.

The invention claimed is:

1. A light control device, comprising:

a light control sheet comprising a first transparent electrode layer, a second transparent electrode layer, and a light control layer formed between the first transparent electrode layer and the second transparent electrode layer; and a control unit comprising circuitry configured to apply a first voltage between the first transparent electrode layer and the second transparent electrode layer to bring the light control sheet into a first state in which infrared light is reflected and visible light is transmitted, apply a second voltage greater than the first voltage between the first transparent electrode layer and the second transparent electrode layer to bring the light control sheet into a second state in which infrared light and visible light are scattered, and apply a third voltage greater than the second voltage between the first transparent electrode layer and the second transparent electrode layer to bring the light control sheet into a third state in which infrared light and visible light are transmitted, wherein the light control layer in the light control sheet includes a transparent polymer layer including voids and a liquid crystal composition retained in the voids and comprising chiral nematic liquid crystals having positive dielectric anisotropy, and the liquid crystal composition in the light control sheet satisfies $0.8 \leq P \times (ne+2no)/3 \leq 2.2$, where P is a helical pitch in μm, no is an ordinary light refractive index, and ne is an extraordinary light refractive index.

2. The light control device according to claim 1, wherein a proportion of an area where liquid crystal molecules in the liquid crystal composition are horizontally aligned in the light control layer is 50% or more in the first state of the light control sheet.

3. The light control device according to claim 1, wherein a proportion of the transparent polymer layer in the light control layer of the light control sheet is less than 50%.

4. The light control device according to claim 1, wherein the liquid crystal composition satisfies $0.98 \leq np/no \leq 1.02$ where np is a refractive index of a polymer material of the transparent polymer layer in the light control sheet, and no is an ordinary light refractive index.

5. The light control device according to claim 1, wherein the light control sheet includes a first alignment layer sandwiched between the first transparent electrode layer and the light control layer, and a second alignment layer sandwiched between the second transparent electrode layer and the light control layer, and each of the first alignment layer and the second alignment layer is a horizontal alignment film.

6. The light control device according to claim 1, wherein the light control sheet includes a first transparent support layer formed on one side of the first transparent electrode layer and supporting the first transparent electrode layer on an opposite side with respect to the light control layer, and a second transparent support layer formed on one side of the second transparent electrode layer and supporting the second transparent electrode layer on an opposite side with respect to the light control layer, and each of the first transparent support layer and the second transparent support layer has an infrared light reflectance of less than 15%.

7. The light control device according to claim 1, wherein the light control device includes the light control sheet in a plurality such that the plurality of light control sheets including a first light control sheet and a second light control sheet, an optical rotation of the liquid crystal composition in the first light control sheet is different from an optical rotation of the liquid crystal composition in the second light control sheet, and the first light control sheet and the second light control sheet are positioned to be superimposed with each other in a thickness direction, and the circuitry of the control unit is configured to bring the first light control sheet and the second light control sheet into the first state, and bring the first light control sheet and the second light control sheet into the third state.

8. The light control device according to claim 7, wherein a peak wavelength of reflected light of the first light control sheet in the first state matches a peak wavelength of reflected light of the second light control sheet in the first state.

9. The light control device according to claim 7, wherein a peak wavelength of reflected light of the first light control sheet in the first state is different from a peak wavelength of reflected light of the second light control sheet in the first state.

10. The light control device according to claim 1, wherein a proportion of an area where liquid crystal molecules in the liquid crystal composition are horizontally aligned in the light control layer is 50% or more in the first state of the light control sheet.

11. The light control device according to claim 1, wherein a proportion of the transparent polymer layer in the light control layer of the light control sheet is less than 50%.

12. The light control device according to claim 1, wherein the liquid crystal composition satisfies $0.98 \leq np/no \leq 1.02$ where np is a refractive index of a polymer material of the transparent polymer layer in the light control sheet, and no is an ordinary light refractive index.

13. The light control device according to claim 1, wherein the light control sheet includes a first alignment layer sandwiched between the first transparent electrode layer and the light control layer, and a second alignment layer sandwiched between the second transparent electrode layer and the light control layer, and each of the first alignment layer and the second alignment layer is a horizontal alignment film.

14. The light control device according to claim 1, wherein the light control sheet includes a first transparent support layer formed on one side of the first transparent electrode layer and supporting the first transparent electrode layer on an opposite side with respect to the light control layer, and a second transparent support layer formed on one side of the second transparent electrode layer and supporting the second transparent electrode layer on an opposite side with respect to the light control layer, and each of the first transparent support layer and the second transparent support layer has an infrared light reflectance of less than 15%.

15. The light control device according to claim 1, wherein the light control device includes the light control sheet in a plurality such that the plurality of light control sheets including a first light control sheet and a second light control sheet, an optical rotation of the liquid crystal composition in the first light control sheet is different from an optical rotation of the liquid crystal composition in the second light control sheet, and the first light control sheet and the second light control sheet are positioned to be superimposed with each other in a thickness direction, and the circuitry of the control unit is configured to bring the first light control sheet and the second light control sheet into the first state, and bring the first light control sheet and the second light control sheet into the third state.

16. The light control device according to claim 15, wherein a peak wavelength of reflected light of the first light control sheet in the first state matches a peak wavelength of reflected light of the second light control sheet in the first state.

17. The light control device according to claim 15, wherein a peak wavelength of reflected light of the first light control sheet in the first state is different from a peak wavelength of reflected light of the second light control sheet in the first state.

18. The light control device according to claim 2, wherein a proportion of the transparent polymer layer in the light control layer of the light control sheet is less than 50%.

19. A light control sheet, comprising a first transparent electrode layer;

a second transparent electrode layer; and a light control layer formed between the first transparent electrode layer and the second transparent electrode layer and comprising a transparent polymer layer including voids and a liquid crystal composition retained in the voids such that the liquid crystal composition includes chiral nematic liquid crystals having positive dielectric anisotropy, wherein the liquid crystal composition exhibits a planar state when a first voltage is applied between the first transparent electrode layer and the second transparent electrode layer such that the light control sheet reflects infrared light and transmits visible light, a focal conic state when a second voltage greater than the first voltage is applied between the first transparent electrode layer and the second transparent electrode layer such that the light control sheet scatters infrared light and visible light, and a homeotropic state when a third voltage greater than the second voltage is applied between the first transparent electrode layer and the second transparent electrode layer such that the light control sheet transmits infrared light and visible light, and the liquid crystal composition satisfies $0.8 \leq P \times (ne+2no)/3 \leq 2.2$ where P is a helical pitch in μm, no is an ordinary light refractive index, and ne is an extraordinary light refractive index.

* * * * *